United States Patent
Lobell

(10) Patent No.: US 9,953,241 B2
(45) Date of Patent: Apr. 24, 2018

(54) SYSTEMS AND METHODS FOR SATELLITE IMAGE PROCESSING TO ESTIMATE CROP YIELD

(71) Applicant: The Board of Trustees of the Leland Stanford Junior University, Stanford, CA (US)

(72) Inventor: David Lobell, Stanford, CA (US)

(73) Assignee: The Board of Trustees of the Leland Stanford Junior University, Standford, CA (US)

( * ) Notice: Subject to any disclaimer, the term of this patent is extended or adjusted under 35 U.S.C. 154(b) by 166 days.

(21) Appl. No.: 14/971,610

(22) Filed: Dec. 16, 2015

(65) Prior Publication Data

US 2016/0171680 A1  Jun. 16, 2016

Related U.S. Application Data

(60) Provisional application No. 62/092,755, filed on Dec. 16, 2014.

(51) Int. Cl.
  *G06K 9/00* (2006.01)
  *G06K 9/62* (2006.01)
  *G06T 7/00* (2017.01)

(52) U.S. Cl.
  CPC ......... *G06K 9/6212* (2013.01); *G06K 9/0063* (2013.01); *G06K 9/00657* (2013.01); *G06T 7/00* (2013.01); *G06K 2009/00644* (2013.01); *G06T 2207/10036* (2013.01); *G06T 2207/20076* (2013.01); *G06T 2207/20081* (2013.01); *G06T 2207/30188* (2013.01)

(58) Field of Classification Search
  None
  See application file for complete search history.

(56) References Cited

U.S. PATENT DOCUMENTS 8,194,916 B2 *  6/2012  Ma ..................... G06K 9/00657
                                                  382/100
8,437,498 B2 *  5/2013  Malsam ............... A01G 25/092
                                                  239/71

(Continued)

OTHER PUBLICATIONS

Sibley et al., "Testing Remote Sensing Approaches for Assessing Yield Variability Among Maize Fields", Agronomy Journal, published Oct. 18, 2013, vol. 106, No. 1, pp. 24-32.

*Primary Examiner* — Tahmina Ansari
(74) *Attorney, Agent, or Firm* — KPPB LLP

(57) ABSTRACT

Systems and methods for generating a crop yield estimate for an area as small as an individual field from images captured by a satellite are disclosed. The system generates simulations of crop yields in a region that includes the area by applying combinations of different parameters to a crop yield models. Observable quantities for simulated yields are determined from the simulations. The simulations and the observable properties are used to train a statistic model for the region that has two or more variables. Images captured by a satellite that include at least a portion of the area are obtained. Crop information is then determined from the images and weather information associated with the dates that the images where captured is obtained. The statistical model is then applied to the crop information and the weather information to determine a crop yield estimate.

18 Claims, 14 Drawing Sheets

(56) References Cited

U.S. PATENT DOCUMENTS

| | | | |
|---|---|---|---|
| 2010/0158314 A1* | 6/2010 | Ma | G06K 9/00657 |
| | | | 382/103 |
| 2012/0048960 A1* | 3/2012 | Malsam | A01G 25/16 |
| | | | 239/1 |
| 2014/0278731 A1* | 9/2014 | Griffin | G06Q 50/02 |
| | | | 705/7.28 |
| 2016/0171680 A1* | 6/2016 | Lobell | G06K 9/6212 |
| | | | 382/110 |
| 2017/0034986 A1* | 2/2017 | Koch | A01B 79/02 |
| 2017/0228743 A1* | 8/2017 | Cousins | G06Q 30/0202 |

* cited by examiner

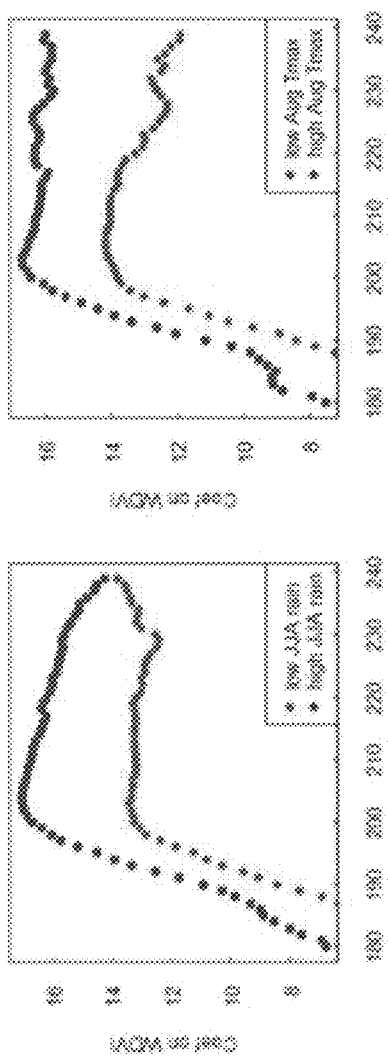

SYSTEMS AND METHODS FOR SATELLITE IMAGE PROCESSING TO ESTIMATE CROP YIELD

CROSS-REFERENCE TO RELATED APPLICATIONS

This application claims priority to U.S. Provisional Patent Application 62/092,755 filed Dec. 16, 2014 which is hereby incorporated by reference as if set forth in its entirety herewith.

FIELD OF THE INVENTION

The present invention relates generally to satellite image processing and more specifically to systems and methods for analyzing satellite images to estimate crop yields for areas the size of individual farms.

BACKGROUND

Lack of reliable information on crop yields can hinder different types of decisions in agriculture and other fields. Farmers typically want to know where to apply more or less inputs such as fertilizers or herbicides, and information on yield history can be very useful. Farmers also often want to know how much to pay for renting new properties and maps of yield histories can help to set expectations. Breeding companies may also want to know how their varieties are performing in different environments.

Images captured by satellites have long been used to generate crop yield estimates on a regional scale. Although some have tried to estimate crop for an area the size of an individual field, they have been unsuccessful in doing so. Often the estimates made using previous methodologies have a yield variation of half or greater than the actual yield. Besides lack of accuracy, other problems with using satellite imagery to estimate crop yield for an area the size of an individual field include the cost associated with getting the images and processing the images to obtain the desired information has been prohibitive and the lack of data of the actual yields of specific areas are often hard to obtain as records.

SUMMARY OF THE INVENTION

The above and other problems are solved and an advance in the art is made by systems and methods for generating a crop yield estimation using satellite image processing in accordance with some embodiments of this invention. In accordance with some embodiments of the invention, an image processing system generates a crop yield estimation for an area as small as a single field in the following manner. The image processing system receives images captured by a satellite. Each of the images includes pixels that correspond to an area and is captured on a particular date. Environmental information for the area on the date that each image was captured is obtained using the image processing system. The environmental information is of a same temporal scale as the environmental information used to generate a statistical model of a region including the area. Crop information for the area from the pixels in the images that correspond to the area is determined using the image processing system. The image processing system applies the statistical model of the region including the area to the environmental information obtained for the area on at least two different dates and the crop information for the area from the at least two different dates determined from the images to determine a crop yield estimate. The statistical model has a plurality of variables including at least one variable from the crop information and at least one variable from the environmental information. The crop yield estimate is provided to an application by the image processing system for use in showing a predicted crop yield for the area.

In accordance with many embodiments, the environmental information includes weather information for the area corresponding to the dates of the capture of each of the images.

In accordance with some embodiments, the statistical model is a multiple variable linear regression.

In accordance with many embodiments, the image processing system may train the statistical model. In accordance with some of these embodiments, the image processing system generates many crop yield simulations for the region using a processing system. Observable quantities from each of the crop yield simulations are determined using the image processing system and the statistical model for the region is trained based upon the crop yield simulations and the observable quantities using the image processing system.

In accordance with a number of these embodiments, the crop yield simulations are generated using historical crop information for the region and historical environmental information for the region. In accordance with some particular embodiments, the generation of the plurality of crop simulations comprises applying different sets of parameters to a crop yield model using the image processing system where the different sets of parameters represent different combinations of crop information and environmental information.

In accordance with some of these embodiments, the crop model used to generate the crop yield simulations is a model selected from the group including Agricultural Production Systems simulator (APSIM), Hybrid-Maize, and DSSAT models.

In accordance with still some other embodiments, the parameters include at least one parameter selected from the group including soil conditions, climate conditions, and management conditions for the region.

In accordance with many embodiments, the observable quantities include at least one observable quantity selected from the group consisting of: optical-based Vegetation indexes (Vis) derived from Leaf Area Indexes (LAIs) and thermal measurements derived from water stress.

In accordance with a number of embodiments, the crop information is determined by applying image processing to the images.

DESCRIPTION OF THE DRAWINGS

FIGS. 9-14 conceptually illustrate graphs showing the training of a regression based upon a two date crop model and considering temperature data in accordance with an embodiment of the invention.

DETAILED DESCRIPTION

Figure 1:
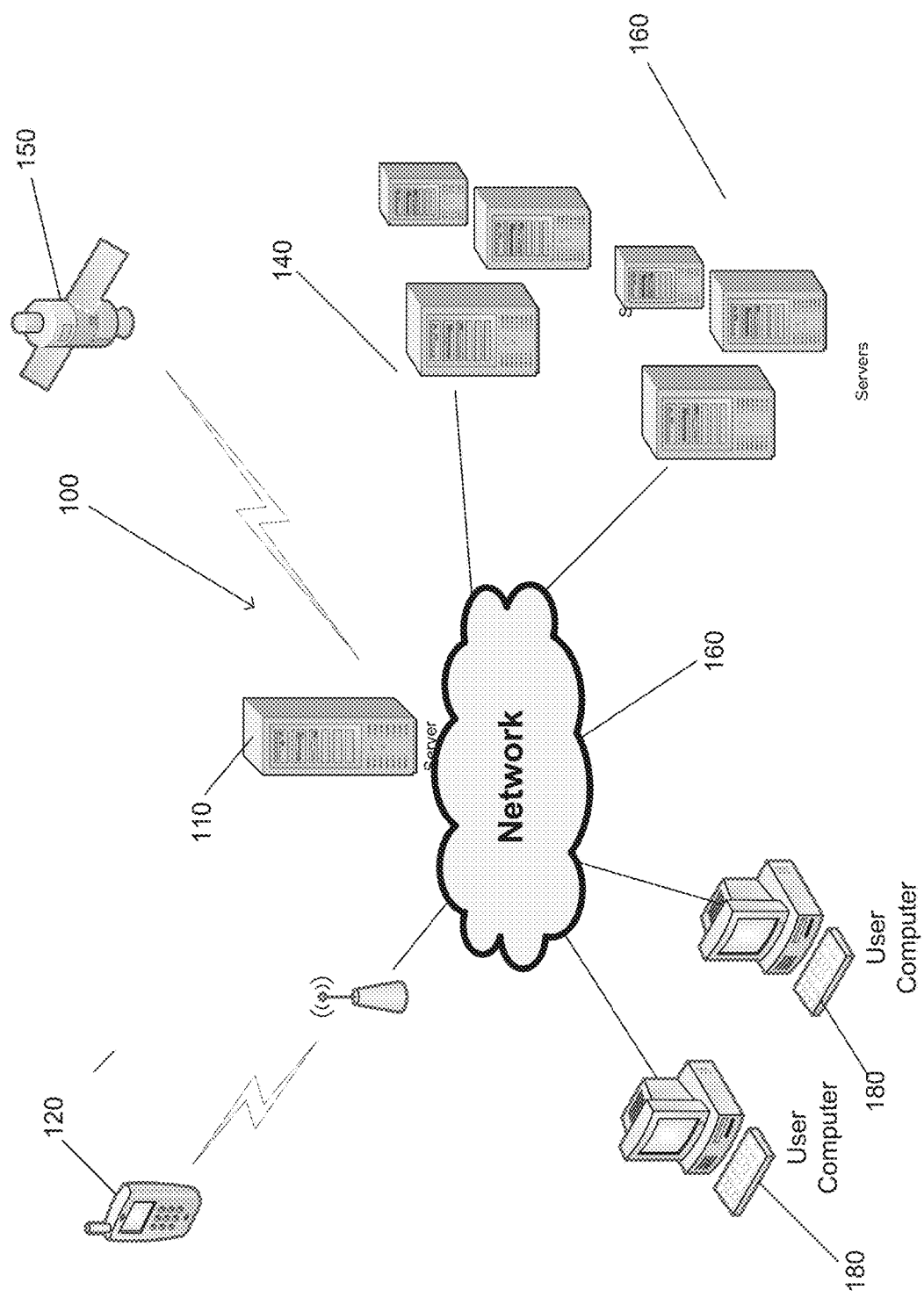
FIG. 1 illustrates a network including devices that perform processes for providing crop yield estimates for an area the size of an individual field from satellite images in accordance with an embodiment of the invention.

Turning now to the drawings, systems and methods for processing satellite images to determine crop yield estimations for an area as small as an individual field using images captured by a satellite in accordance with various embodiments of the invention are disclosed. In accordance with some embodiments of the invention, a statistical model that has two or more variables is used to determine a crop yield estimate of an area the size of an individual field. For purposes of this discussion, an individual field is an individual farm and/or individual field that is a smaller portion of an individual farm that is observable in an image captured by a satellite that may be represented by a portion of the pixels in an image. In accordance with many embodiments that area may be the area represented by a single pixel in the image. In a number of embodiments, crop yield estimates can be generated at a resolution of 30 square meters or less. In accordance with some embodiments, the statistical model is a linear regression having two or more variables. In accordance with many embodiments, the variables include, but not limited to, Vegetation Index (VI), multiple dates of the VI observations, and weather related predictors.

In accordance with some embodiments, a statistical model for a particular region is trained using crop model simulations that simulate crop yields and other crop attributes for a range of realistic parameters. The parameters include but are not limited to, soil conditions, climate conditions, and management conditions for the region. In accordance with many embodiments, the crop model simulations capture the main responses of one or more daily crop attributes and crop yield to the various combinations of parameters. The one or more daily attributes of the crop include, but are not limited to the Leaf Area Index (LAI), water stress, and nitrogen stress, as well as season total of biomass and yield in accordance with a number of embodiments.

The crop model simulation daily output results are converted to observable qualities in accordance with some embodiments. The observable qualities include, but are not limited to, optical-based VIs derived from LAIs, thermal measurements related to water stress, or radar backscatter in accordance with a number of embodiments. The observable qualities and the crop yield simulations of a region are then combined to train the statistical model of the region.

After the statistical model of a region is trained, the model may be used to generate a crop yield estimate for an area in the region as small as an individual field in accordance with some embodiments of the invention. To do so, one or more satellite images that include pixels relating to at least a portion of the area are obtained. In accordance with some embodiments, the weather specific information for the pixels of the images must be known for the temporal scale used in the statistical model. Information about the parameters of the statistical model is then determined from the images. In accordance with several embodiments, the information is obtained on a pixel per pixel basis. The parameter information for the area obtained from the images is then applied to the statistical model and a crop yield estimate for the area is generated in accordance with some embodiments of the invention.

A more complete description of systems and methods for generating crop yield estimates for an area as small as an individual field from images captured by a satellite in accordance with some embodiments of the invention is described further below with reference to the drawings.

System Overview

A system that generates a crop yield estimate for an area as small as an individual field in accordance with an embodiment of the invention is shown in FIG. 1. Network 100 includes a communications network 160. The communications network 160 is a network such as the Internet that allows devices connected to the network 160 to communicate with other connected devices. A server system 110 that obtains images captures and stores imaged captured by a satellite 150 is connected to the network 160. Devices may communicate with server system 110 to obtain the images captured by the satellite. Server systems 140 and 170 are connected to the network 160 are each a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 140 and 150 are shown each having three servers in the internal network. However, the server systems 140 and 150 may include any number of servers and any additional number of server systems may be connected to the network 160 to provide cloud services.

Users may use personal devices 180 and 120 that connect to the network 160 to perform processes for generating crop yield estimations and/or use cloud services to generate crop yield estimates in accordance with various embodiments of the invention. In the shown embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 20 may be a mobile phone, Personal Digital Assistant (PDA), a tablet, a smartphone, or any other type of device that connects to network 16 via wireless connection without departing from this invention.

Example of a Processing System

Figure 2:
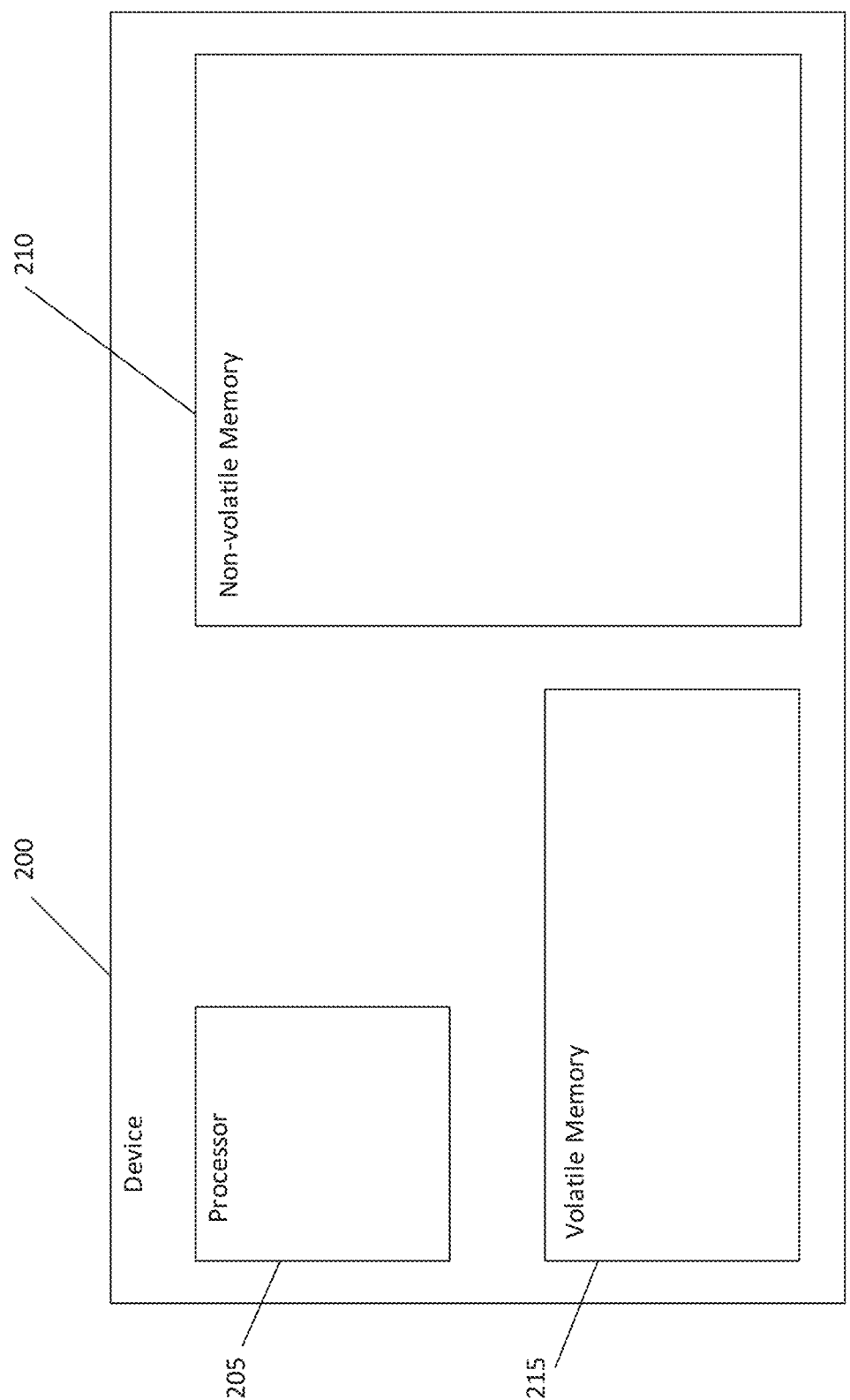
FIG. 2 illustrates a diagram of a processing system in a device that performs processes for providing crop yield estimates for an area the size of an individual field in accordance with an embodiment of the invention.

An example of a processing system in a device that executes instructions to perform processes that provide the crop yield estimate for an area as small as an individual field and interact with other devices connected to the network as shown in FIG. 1 in accordance with various embodiments of this invention is shown in FIG. 2. One skilled in the art will recognize that a particular processing system may include other components that are omitted for brevity without departing from this invention. The processing device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or the non-volatile memory 210 to manipulate data stored in the memory. The non-volatile memory 210 can store the processor instructions utilized to configure the processing system 200 to perform processes including processes in accordance with embodiments of the invention and/or data for the processes being utilized. In other embodiments, the processing system software and/or firmware can be stored in any of a variety of non-transient computer readable media appropriate to a specific application. A network interface is a device that allows processing system 200 to transmit and receive data over a network based upon the instructions performed by processor 205. Although a processing system 200 is illustrated in FIG. 2, any of a variety of processing system in the various devices can configured to provide the methods and systems in accordance with embodiments of the invention can be utilized.

Crop Yield Estimation for an Area as Small as an Individual Field

Figure 3:
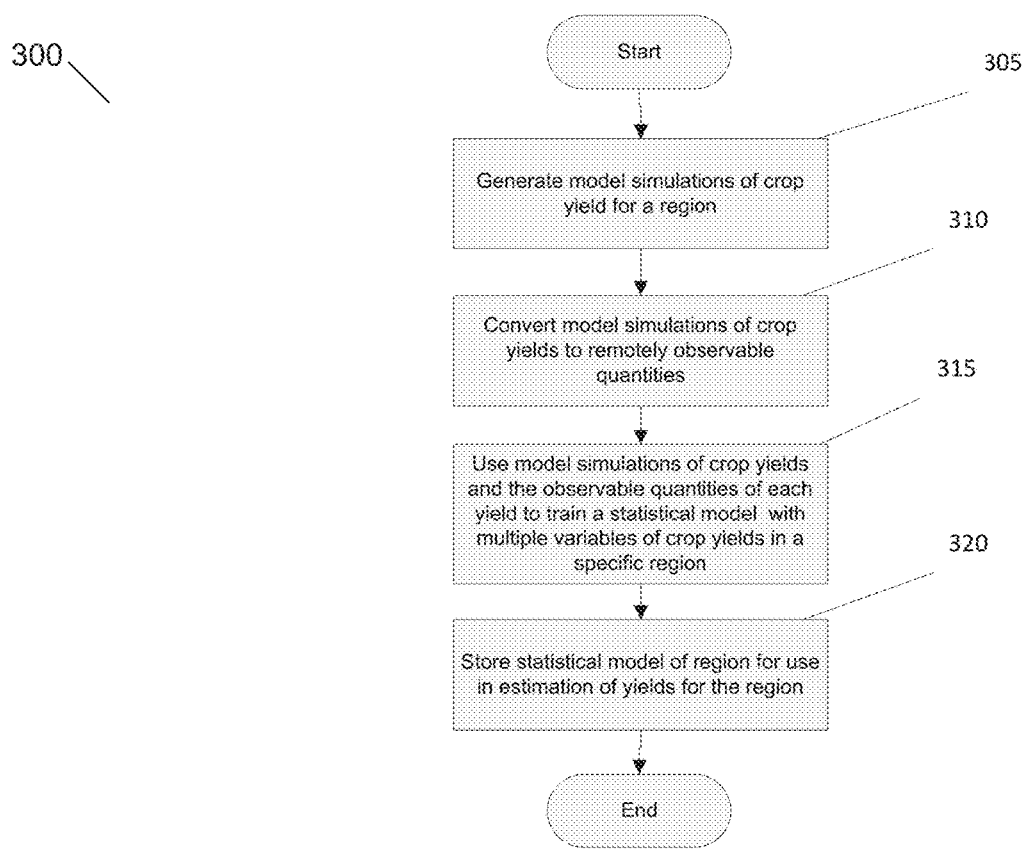
FIG. 3 illustrates a flow diagram of a process for generating statistical models for generating crop yield estimates for areas within a region in accordance with an embodiment of the invention.

In accordance with some embodiments of the invention, crop yield estimation is generated using a statistical model for a region. To do so, the statistical model must be trained. Information about the field includes measure of certain attributes determined from satellite images that include the area. The information including the attributes can be applied to the statistical model to generate crop yield estimation. A process for training the statistical model that is performed by a device and/or one or more devices in a cloud system in accordance with an embodiment of the invention is shown in FIG. 3.

Process 300 includes generating model simulations of the crop of a region (305), converting the model simulations into observable quantities (310), training the statistical model for the region using the model simulation of yield and observable quantities for the region (315), and storing the trained statistical model of a region (320) for use in generating crop yield estimations of an area in the region from information determined from images captured from a satellite.

In accordance with some embodiments of the invention, the generating of the model simulations of the crop yield of a region includes generating multiple simulations that span a range of realistic parameters. The parameters include but are not limited to, soil conditions, climate conditions, and management conditions for the region in accordance with some embodiments. In accordance with many embodiments, each crop model simulation captures the main responses of one or more daily crop attributes of the crop as well as yield to a particular combination of parameters. The one or more daily crop yield attributes of the crop yield include, but are not limited to the Leaf Area Index (LAI), water stress, and nitrogen stress, as well as on season total of bio mass, and yield in accordance with a number of embodiments. In accordance with some embodiments, the simulations are generated using a well-tested crop model.

Examples of the manner in which such regressions can be constructed based upon crop model simulations are disclosed in Sibley et al. "Testing Remote Sensing Approaches for Assessing Yield Variability Among Maize Fields", Agronomy Journal, 106(1), 24, the relevant disclosure from which related to crop model based regression is incorporated by reference herein in its entirety. In accordance with certain embodiments, the Agricultural Production Systems simulator (APSIM) crop model is utilized. Other examples, in accordance with various embodiments of the invention, of well-tested crop models include, but are not limited to, Hybrid-Maize, and DSSAT. However, a regression can be trained based upon simulations across multiple sites and years based upon one or more of any of a variety of models appropriate to the requirements of a specific application in accordance with various embodiments of the invention. An important characteristic of systems in accordance with many embodiments of the invention is that the system does not rely on ground calibration and yet still provides field level resolution.

The crop yield model simulation daily attributes are converted to observable qualities in accordance with some embodiments (310). The observable qualities include, but are not limited to, optical-based VIs derived from LAIs, and thermal measurements derived from related to water stress, or radar backscatter in accordance with a number of embodiments. In accordance with some embodiments, the conversions may be taken from established publication and include, but are not limited to, LAI vs. WDVI, LAI vs. c-band backscatter, water supply: demand ratio vs. evaporative backscatter.

The observable qualities and the crop yield simulations of a region are then combined to train the statistical model of the region (315). In accordance with some embodiments, the statistical model is a linear regression. In accordance with many of these embodiments, the liner regression is a multiple variable linear regression. The multiple linear regression may depend upon VI, weather based predictors, and observations of the VI on multiple dates. In accordance with a number of embodiments, the multiple variable linear regression that can be defined for a specified combination of dates is expressed as:

$$\text{Yield} = \beta_{0,d} + \beta_{1,d} * W + \beta_{2,d} * RM_d + \beta_{3,d} * W * RM_d$$

Where W is a vector of weather attributes over the growing season. RM is a vector of remote sensing based measures on dates d, and all coefficients β are specific to particular image dates. As the dates of usable imagery for generating the information may differ by location and year, linear regressions may be computed for an arbitrary number of combinations of image dates and the resulting coefficients may be stored in a table for later use in accordance with some embodiments. Furthermore, the linear regression training also results in a summary of model fit which may be used to determine which observation dates are likely to result in the highest crop yield accuracies. The training of a regression based upon a two date crop model and considering temperature data is conceptually illustrated in FIGS. 9-14.

Although a process for generating and training a statistical model in accordance with an embodiment of the invention is described above with respect to FIG. 3, other processes for training a statistical model that combine steps, omit steps and/or include different steps may be used in accordance with other embodiments of the invention.

Figure 4:
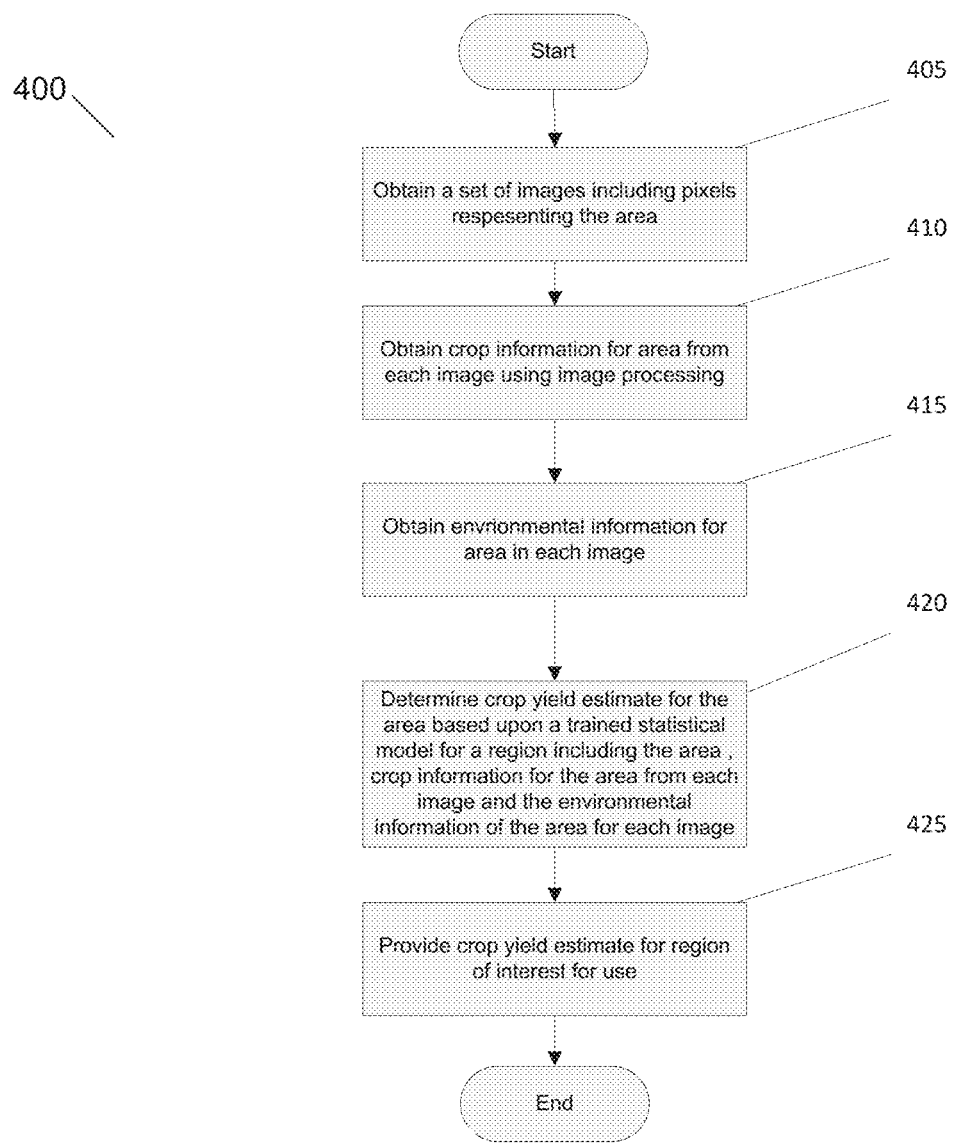
FIG. 4 illustrates a flow diagram of a process for generating an estimate for an area within a particular region in accordance with an embodiment of the invention.
Figure 5:
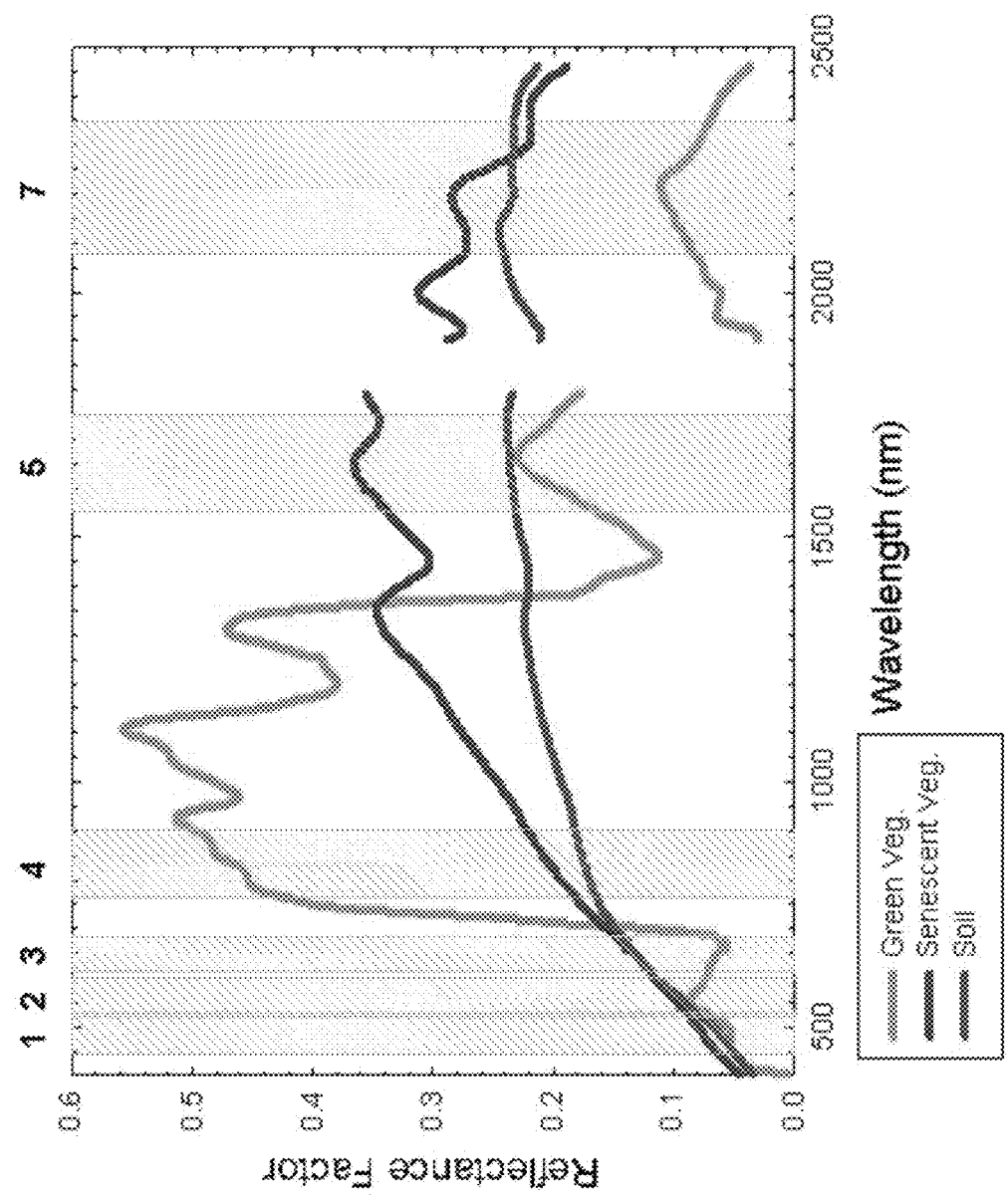
FIGS. 5-8 illustrate graphs showing results of spectra and yield estimate simulations.
Figure 6:
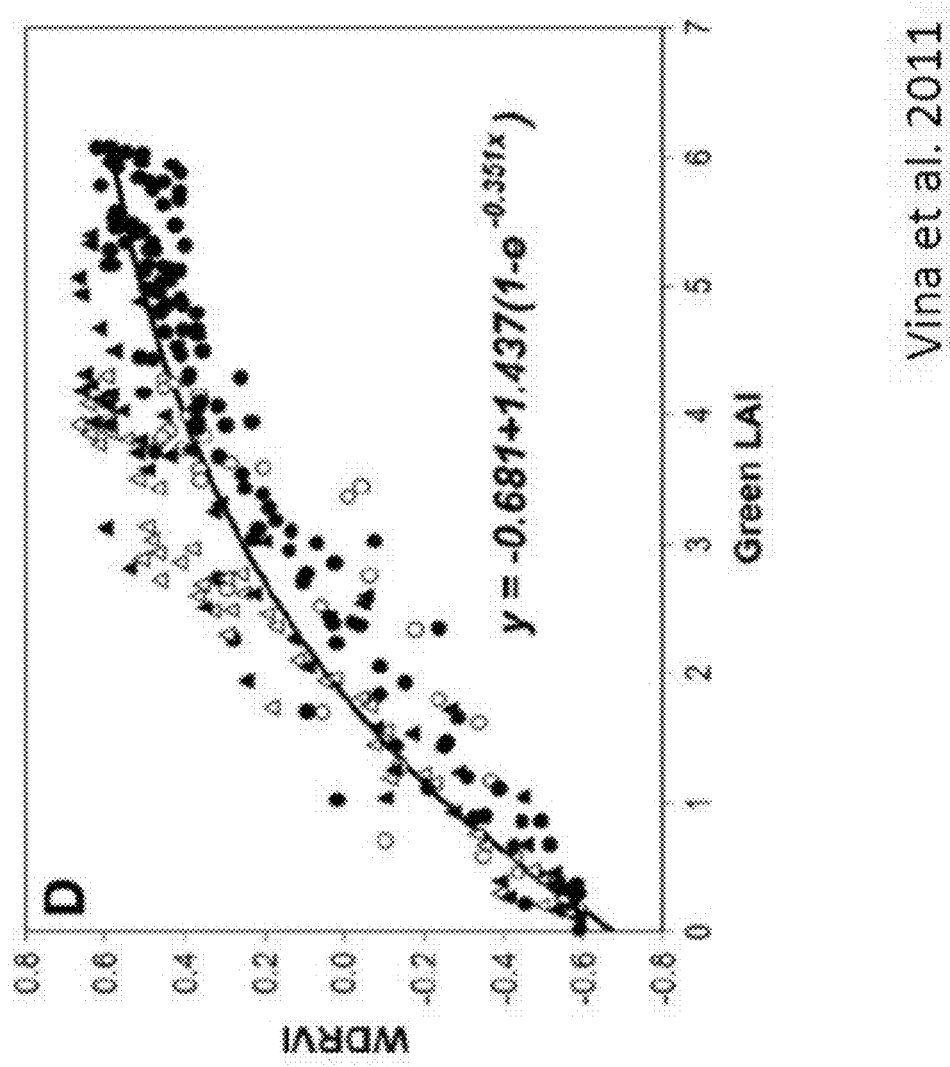
Figure 7:
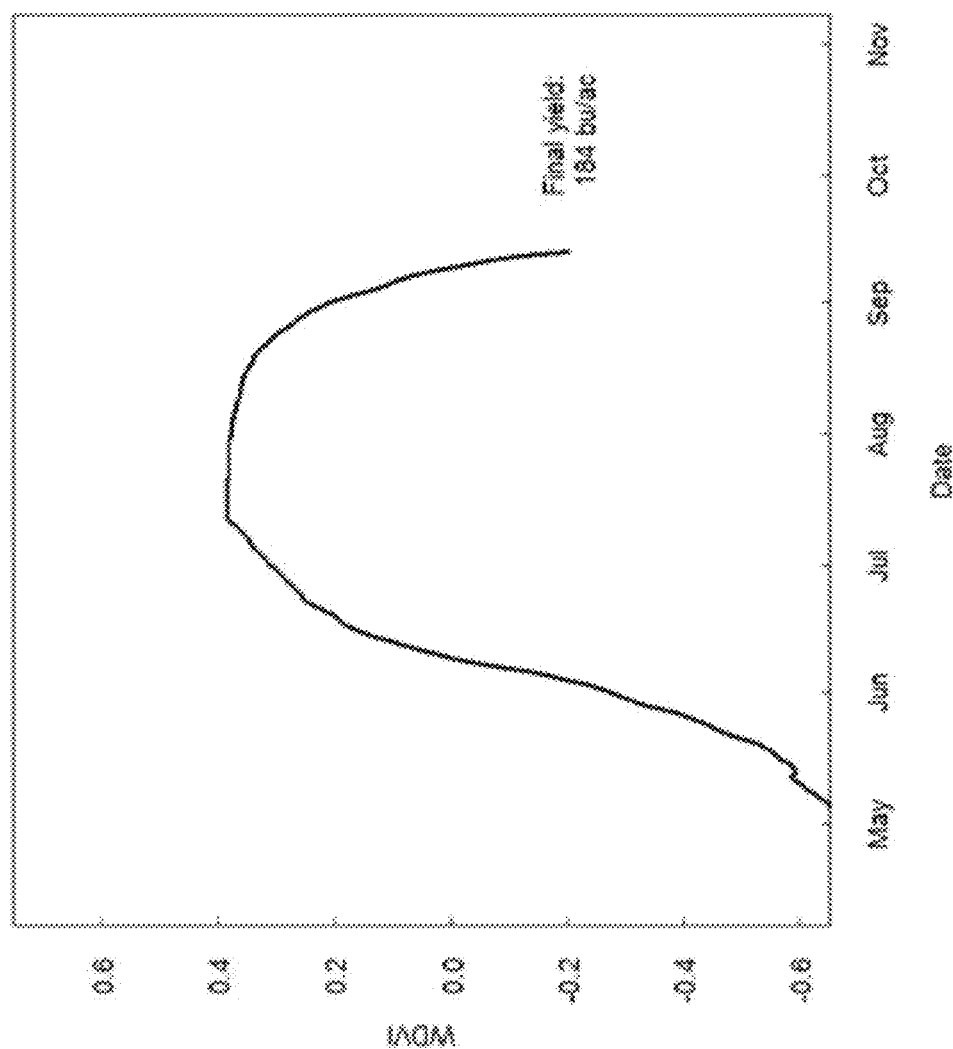
Figure 8:
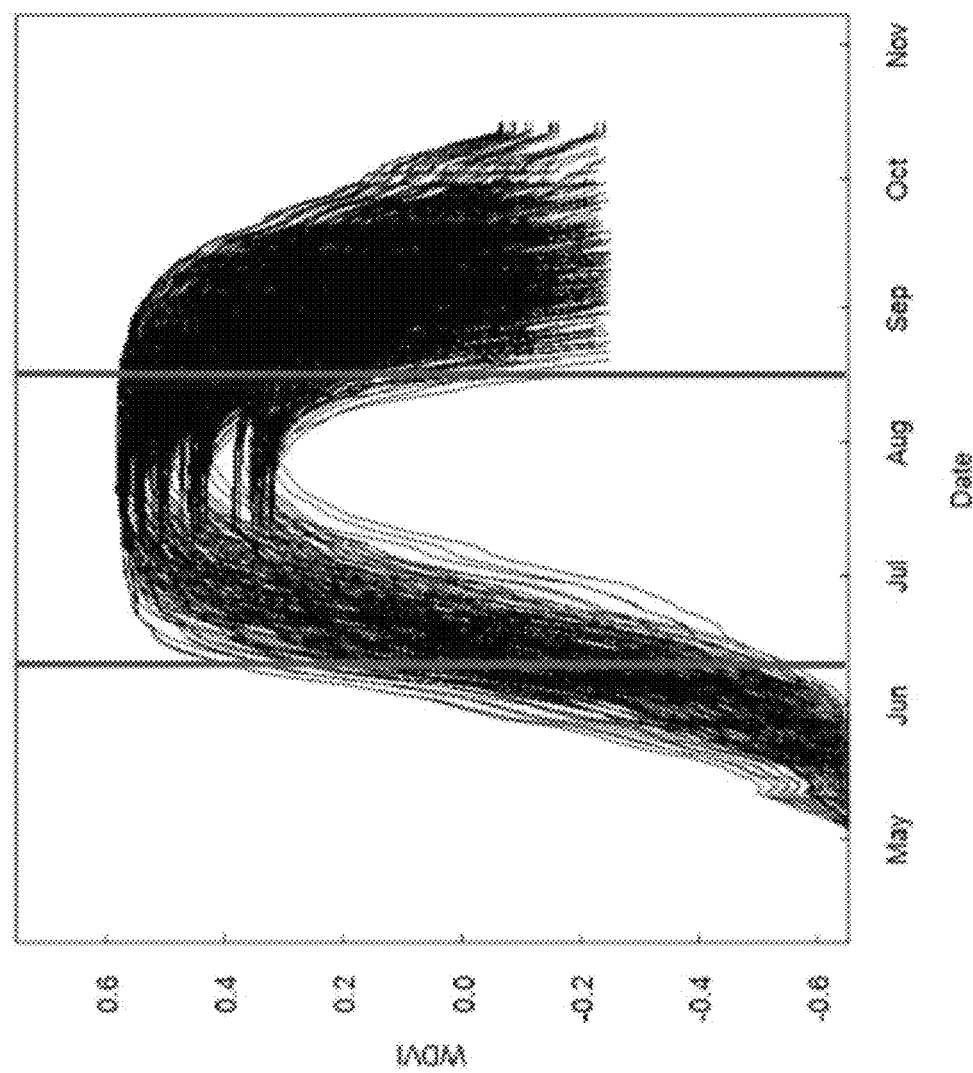
Figure 10:
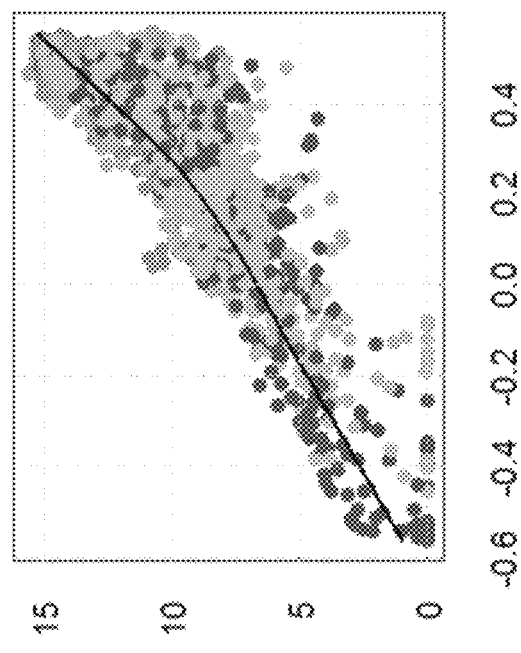
Figure 9:
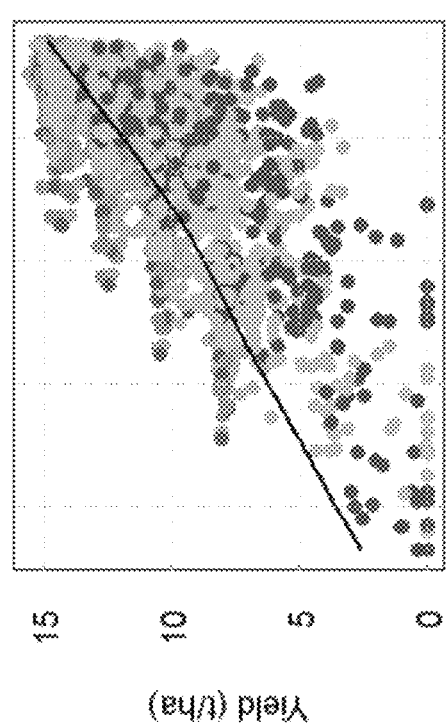

To determine a crop yield estimate for an area in a particular region, the trained statistical model (linear regression) is applied to information determined from satellite images of the area. A process for obtaining the information from images captured by a satellite and using the information to generate a crop yield estimate for the area using one or more processing devices in accordance with an embodiment of the invention is shown in FIG. 4.

Process 400 includes receiving a set of images captured by the satellite that show the area (405), using image processing to obtain information about the crops in the area (410), obtain environmental information for the area (415), apply the statistical model for the region to the information for the area obtained from the images and the environmental and/or meteorological information (420) to generate the crop yield estimate, and provide the crop yield estimate to application for use (425) and/or store the crop yield estimate.

In accordance with some embodiments of the invention, the set of images received include one or more images captured by a satellite. Each of the images in the set includes one or more pixels that show at least a portion of the area. In accordance with many embodiments, the pixels in an image from the set of images showing the area meets the requirements of specific weather conditions and temporal scale of the weather conditions used to generate the linear regression. In accordance to some embodiments, information from a pixel is only obtained from an image from the best observable data for the pixel. In accordance with some embodiments, the information is determined on a pixel-by-pixel basis for the area. In accordance with some embodiments, the images are obtained from the Google Earth Engine Platform. However, the images may be obtained from other providers without departing from the various embodiments of this invention.

Figure 15:
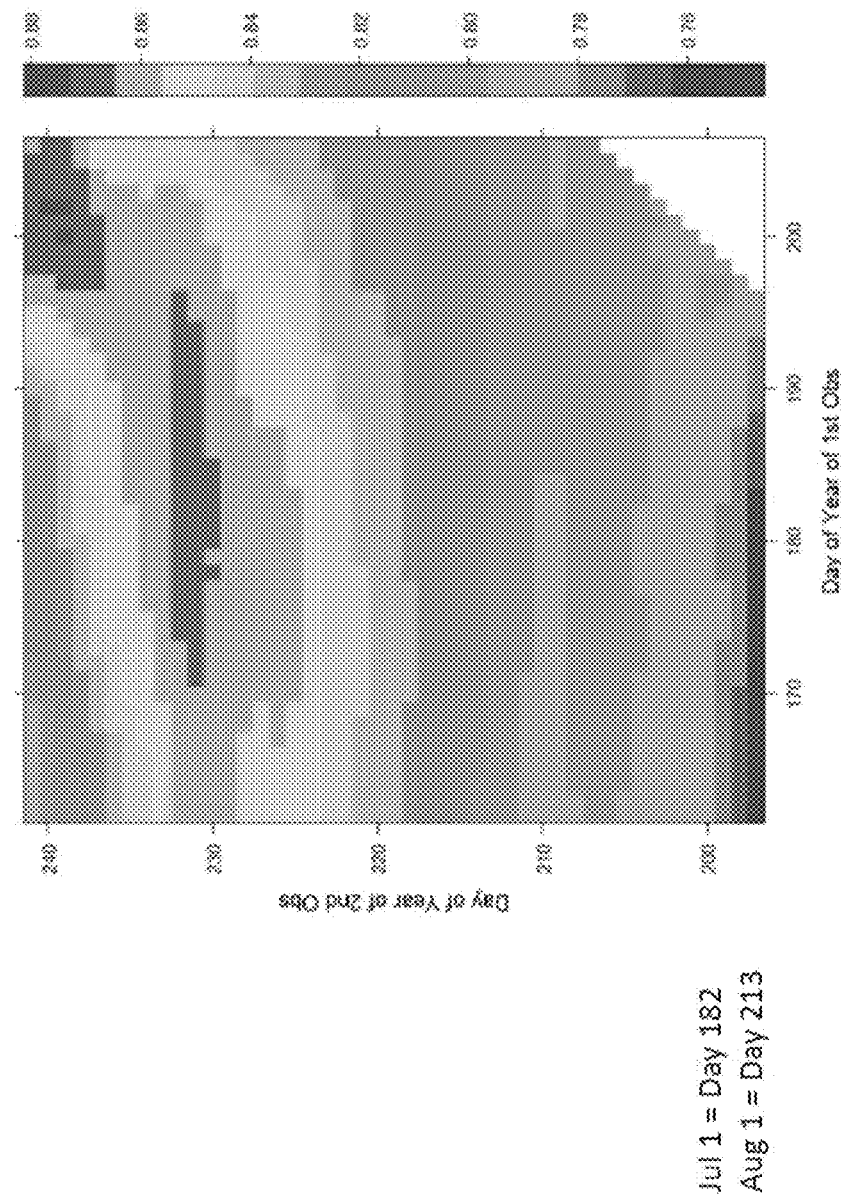
FIG. 15 illustrates a graph showing sensitivity of the crop yield estimates to the dates on which the vegetation index measurements are observed in accordance with an embodiment of the invention.
Figure 16:
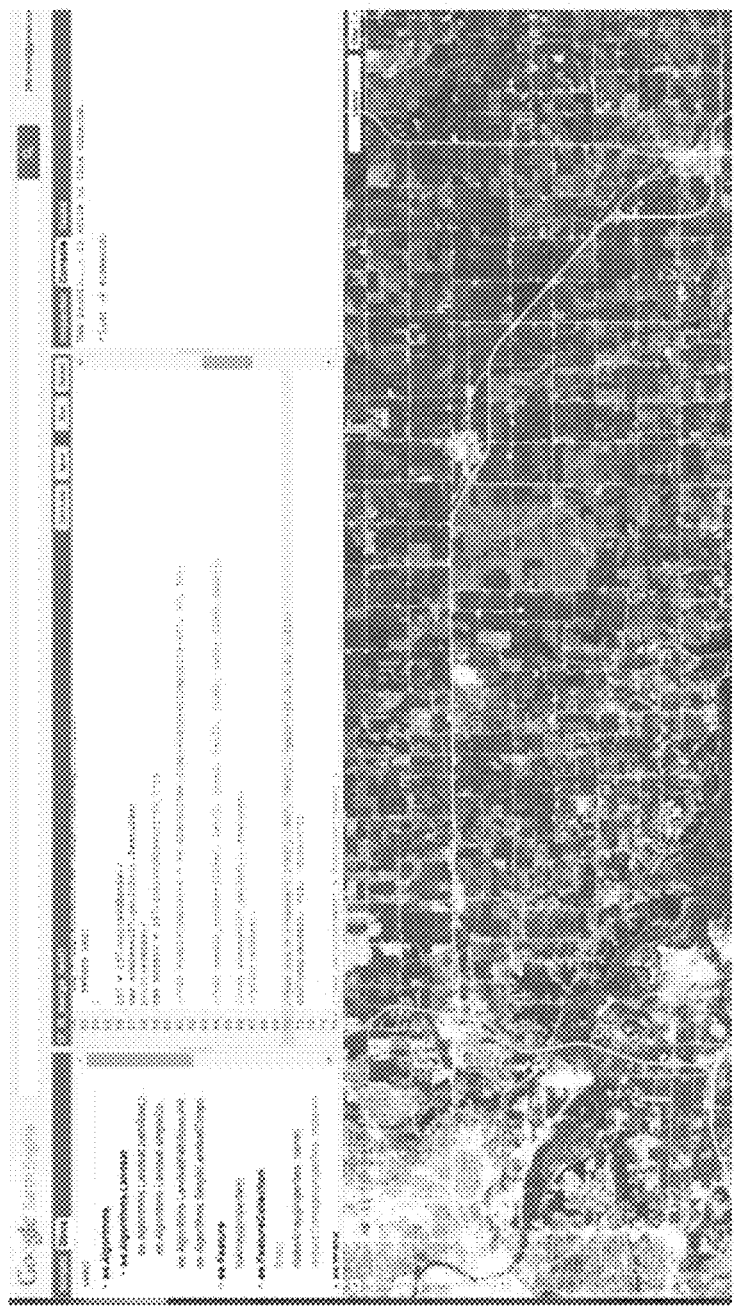
FIGS. 16-18 illustrate exemplary crop yield estimates obtained using a system in accordance with an embodiment of the invention.
Figure 17:
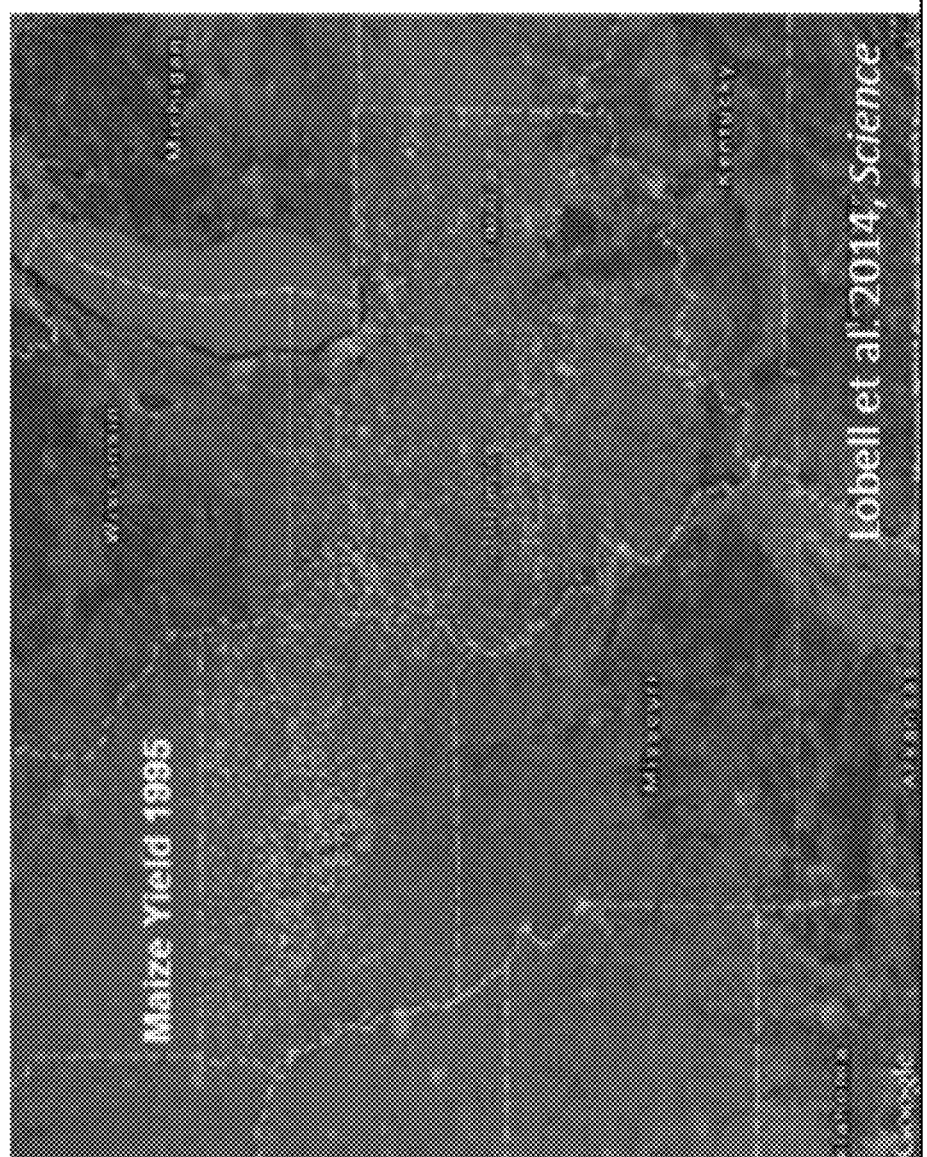
Figure 18:
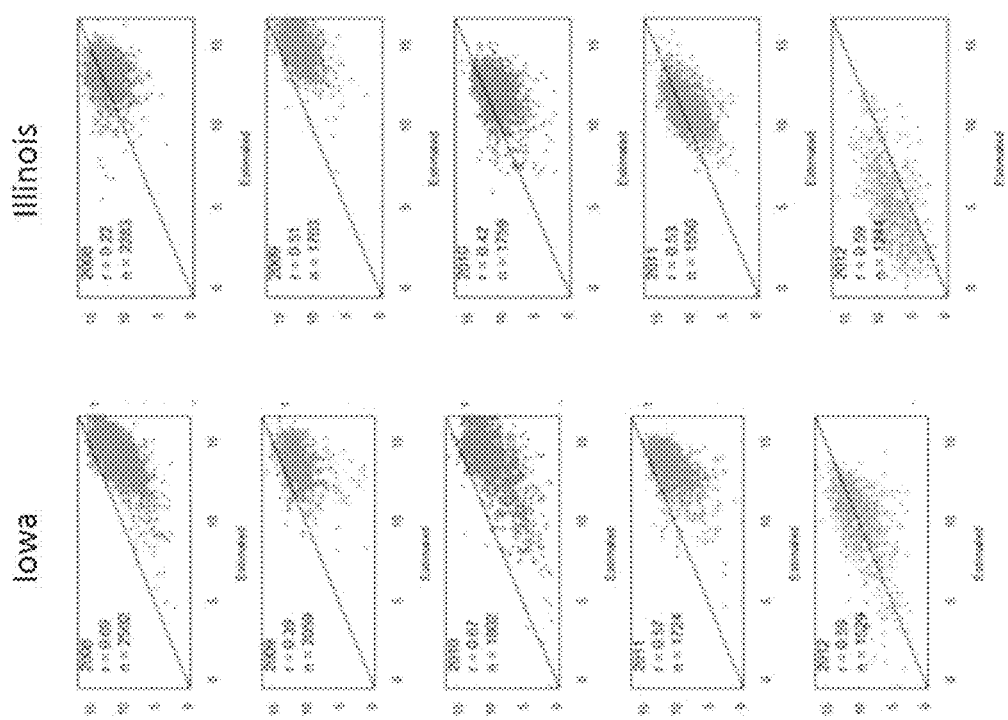

In accordance with many embodiments, each pixel in an image, such as a high yield crop estimation map, can utilize spectral observations obtained on a different set of dates relative to other pixels by simply utilizing different regressions. Spectra and yield estimate simulations are conceptually illustrated in FIGS. 5-8. The sensitivity of the crop yield estimates to the dates on which the vegetation index measurements are observed is conceptually illustrated in FIG. 15 and exemplary crop yield estimates obtained using a system in accordance with an embodiment of the invention are presented in FIGS. 16-18.

In accordance with many embodiments of the invention, the environmental information may include (but is not limited to) weather information for the area during the time that each image was captured. The weather information may be received from a gridded weather product in accordance with some embodiments.

In accordance with some embodiments, the crop yield estimate is provided to an application (425) that generates pixels in an image of the area that indicate the crop yield estimate for the area. In accordance with many embodiments, the crop yield estimate provided to an application (425) that receives multiple crop yield estimates for the area and determines the best management practices for the area to obtain the greatest crop yield.

Although a process for determining a crop yield estimate for an area from images captured by a satellite in accordance with an embodiment of the invention is described above with reference to FIG. 4. Other embodiments may use process that combine, omit, and/or add steps without departing from this invention.

Examples of Crop Yield Estimates Using the Systems and Processes in Accordance with an Embodiment of the Invention Crop yield estimates for rain fed maize were generated for 6 sites in the Midwestern United States. The crop yield model simulations were generated using the APSIM model that has been widely applied and tested in the region. A total of 4200 simulations were run spanning the six sites, 14 years, and a range of management characteristics.

After the simulations were completed, the LAI outputs from the simulations were converted to values of the Green Chlorophyll Vegetation Index (GCVI). GCVI is defined in the following manner:

$$GCVI = \rho_{nir}/\rho_{grn} - 1$$

Where $\rho_{nir}$ and $\rho_{grn}-1$ represent reflectance at near infrared and green wavelengths respectively. Based on field measurements of maize and soybean canopies, the following equation converts LAI to GCVI for maize:

$$GVCI = 1.4 * LAI^{1.03} + 0.93$$

GVCI was chosen because GVCI is sensitive to variation in LAI for denser canopies commonly found in the Midwest. However, other canopy properties could be substituted for GVCI if desired.

Four weather variables are defined for the regression that are expected to influence the crop yields of fields in this region. The weather variables are June-August total rainfall, June-August mean solar radiation, July average daytime vapor pressure deficit, and August daytime maximum temperature. The weather variables are allowed to interact with the GCVI measurements in the regression.

In addition, the regression was trained using the combination of images from two different dates, one from an "early-season" window and a second from a "late-season" window. The "early-season" window being from day 161-200 of the year (June 10-July 19) and the "late-season" window being days 201-240 of the year (July 20-August 208). The coefficients for each combination of dates were then imported into a Google Fusion Table for use.

To generate the crop yield estimation, all Landsat 5 and Landsat 7 imagery for 2008-2013 acquired within a three state area for the two windows was used. The Google Earth Engine (GEE) service provided by Google, Inc. of Mountain View, Calif. was used to calculate the GCVI. GEE was also used to mark those pixels that may contain clouds. Any pixel that had a 10% or greater chance of containing clouds based on the GEE Simple CloudScore Algorithm was masked as cloudy and not considered. The remaining pixels in the images were aggregated in each window for each year using the maximum GVCI as a reducer. In other words, the maximum value for GCVI for each pixel and the date that the maximum was observed were extracted from both early and late season windows.

The four weather variables were computed for each pixel from the Daymet gridded daily weather dataset available within GEE. Non-maize pixels were also masked out based on 30 m resolution gridded crop maps produced by the USDA as part of the Cropland DataLayer. For each pixel classified as maize and with at least one non-cloud contaminated pixel observation in an image within the observation window, the dates of the maximum GCVI were used to identify the corresponding regression equation and the coefficients were used to estimate crop yield for the pixel. The computation of the crop yield estimates including the composting and masking steps took approximately two minutes per 10,000 $Km^2$ per year.

In accordance with another embodiment, the process described above with respect to rainfed maize was used to generate crop estimates for soybeans in the same area except for the following differences: Yields were simulated with APSIM-Soybean instead of APSIM-Maize, The LAI was converted to GCVI using the soybean equation ($GCVI=1.4*LAI^{1.3}+1.1$), pixels classified as soybean were selected and pixels identified as maize were masked, the "early season" window and "late season" window were shifted to days 195-229 and 230-264 of the year respectively; and the log(GCVI) was used instead of GVCI because soybean GCVI tends to increase non-linearly at high LAI.

The results of the computations were then compared to reports provided by farmers to the USDA Risk Management Agency for insurance purposes in the following manner. The reports were joined to shapefiles of Common Land Units (CLUs) made available by Texas A&M. To ensure consistency, with the CLUs in addition to the geolocation match, the obtained data was filtered to only include records that were only one CLU based on an acreage match between the reported data and the CLUs with a tolerance of +/−1 acre. Cases where multiple crops were reported for a CLU were omitted to prevent ambiguity. Due to the size of the data, the comparison was limited to only particular portions of the states. In total, 17402 maize estimates and 11,677 soybean estimates were compared across 15 state-year combinations. With regards to maize, the comparisons showed significant positive correlations in all combinations of years and states, with correlations ranging from 0.38 to 0.76 ($R^2$ between 0.14 and 0.58). When combined into a single comparison of all 17,402 maize estimates, the overall correlation was 0.6 ($R^2$=0.35) which is approximately the average of individual correlations. For soybeans, the comparisons between the estimated crop yields and the reported crop yields ranged from 0.19 to 0.74 ($R^2$ between 0.03 and 0.55). A more complete explanation of the maize and soybean crop yield estimates in accordance with an embodiment of this invention and the reported crop yields is provided in the article titled "A scalable satellite-based crop yield mapper" Remote Sensing of the Environment 164 (2015) by Lobell et al. which is hereby incorporated by reference as if set forth herewith.

While the above description contains many specific embodiments of the invention, these should not be construed as limitations on the scope of the invention, but rather as an example of one embodiment thereof. Accordingly, the scope of the invention should be determined not by the embodiments illustrated but by the following claims.

What is claimed is:

1. A method for processing satellite images to determine a crop yield estimate for an area as small as an individual field in a region from images captured by a satellite comprising:
   receiving a plurality of images captured by a satellite in a processing system, wherein each of the plurality of images includes pixels that correspond to an area and is captured on a particular date;
   obtaining weather information for the area on the date that each of the plurality of images was captured using the processing system;
   determining a plurality of observable quantities for the area from the pixels in the plurality of images that correspond to the area using the processing system;
   determining a crop yield estimate for the area by applying a statistical model of the region including the area to the weather information obtained for the area on at least two different dates and the plurality of observable quantities for the area for the at least two different dates determined from the plurality of images using the processing system, wherein the statistical model has a plurality of variables including at least one variable from the plurality of observable quantities and at least one variable from the weather information and wherein the weather information for the area is of a same temporal scale as the weather information used to generate the statistical model; and
   providing the crop yield estimate to an application for use in showing a predicted crop yield for the area.

2. The method of claim 1 wherein the statistical model is a multiple variable linear regression.

3. The method of claim 1 further comprising:
   generating a plurality of crop yield simulations for the region using a processing system;
   determining the plurality of observable quantities from each of the plurality of crop yield simulations using a processing system; and
   training the statistical model for the region based upon the plurality of crop yield simulations and the plurality of observable quantities using the processing system.

4. The method of claim 3 wherein the plurality of crop yield simulations are generated using historical crop information for the region and historical environmental information for the region.

5. The method of claim 4 wherein the generation of the plurality of crop yield simulations comprises applying a plurality of different sets of parameters to a crop yield model using the processing system wherein the plurality of different sets of parameters represent different combinations of crop information and environmental information.

6. The method of claim 5 wherein the crop yield model is a model selected from the group consisting of: Agricultural Production Systems simulator (APSIM), Hybrid-Maize, and DSSAT.

7. The method of claim 5 wherein the plurality of different sets of parameters includes at least one parameter selected from the group consisting of: soil conditions, climate conditions, and management conditions for the region.

8. The method of claim 3 wherein the observable quantities from each of the plurality of crop yield simulations include at least one observable quantity selected from the group consisting of: optical-based Vegetation indexes (Vis) derived from Leaf Area Indexes (LAIs) and thermal measurements derived from water stress.

9. The method of claim 1 wherein the plurality of observable quantities are determined by applying image processing to the plurality of images.

10. An image processing system for determining a crop yield estimate for an area as small as an individual field in a region from images captured by a satellite comprising:
    at least one processor;
    memory accessible by each of the at least one processors; and
    instructions stored in the memory that direct the at least one processors to:
      receive a plurality of images captured of by a satellite wherein each of the plurality of images include pixels that correspond to the area and is captured on a particular date;
      obtain weather information for the area on the date that each of the plurality of images was;
      determine a plurality of observable quantities for the area from the pixels the plurality of images that correspond to the area;
      determine a crop yield estimate for the area by applying a statistical model of the region including the area to the weather information and the plurality of observable quantities obtained for the area on at least two different dates wherein the statistical model has a plurality of variables including at least one variable from the plurality of observable quantities and at least one variable from the weather information and wherein the weather information for the area is of a same temporal scale as the weather information used to generate the statistical model; and
      provide the crop yield estimate to an application for use in showing predicted crop yield for the area.

11. The system of claim 10 wherein the statistical model is a multiple variable linear regression.

12. The system of claim 10 wherein the instructions further direct the at least one processors to:
- generate a plurality of crop yield simulations for the region;
- determine the plurality of observable quantities from each of the plurality of crop yield simulations; and
- train the statistical model for the region based upon the plurality of crop yield simulations and the plurality of observable quantities.

13. The system of claim 12 wherein the plurality of crop yield simulations are generated using historical crop information for the region and historical environmental information for the region.

14. The system of claim 13 wherein the generation of the plurality of crop yield simulations is performed by applying a plurality of different sets of parameters to a crop yield model wherein the plurality of different sets of parameters represent different combinations of crop information and environmental information.

15. The system of claim 14 wherein the crop yield model is a model selected from the group consisting of: Agricultural Production Systems simulator (APSIM), Hybrid-Maize, and DSSAT.

16. The system of claim 14 wherein the plurality of different sets of parameters include at least one parameter selected from the group consisting of: soil conditions, climate conditions, and management conditions for the region.

17. The system of claim 12 wherein the observable quantities from each of the plurality of crop yield simulations include at least one observable quantity selected from the group consisting of: optical-based Vegetation indexes (Vis) derived from Leaf Area Indexes (LAIs) and thermal measurements derived from water stress.

18. A non-transitory machine readable medium accessible by one or more processor that store instructions that direct the one or more processors to perform the method comprising:
- receiving a plurality of images captured of by a satellite in wherein each of the plurality of images includes pixels that correspond to a portion of an area in a region and is captured on a particular date;
- obtaining weather information for the area on the date each image was captured;
- determining a plurality of observable quantities for the area from the plurality of images;
- determining a crop yield for the area by applying the statistical model of the region including the area to the weather information on at least two different data and the plurality of observable quantities on the two different dates determined from the plurality of images wherein the statistical model has a plurality of variables including at least one variable from the plurality of observable quantities and at least one variable from the weather information; and
- providing the crop yield estimate to an application for use in showing the predicted crop yield of the area.

* * * * *